United States Patent [19]

Williams

[11] 3,866,024

[45] Feb. 11, 1975

[54] DIGITAL LOG-TIME GENERATOR

[75] Inventor: Richard E. Williams, Reston, Va.

[73] Assignee: Scope Incorporated, Reston, Va.

[22] Filed: Oct. 23, 1973

[21] Appl. No.: 408,616

[52] U.S. Cl. ....... 235/92 CC, 235/92 R, 235/92 VA, 235/92 PL, 235/92 MB

[51] Int. Cl. .......... H03k 21/06

[58] Field of Search ...... 235/92 MB, 92 CC, 92 DE, 235/92 VA, 92 PL

[56] References Cited

UNITED STATES PATENTS

| | | | |
|---|---|---|---|
| 2,886,243 | 5/1959 | Sprague | 235/92 DE |
| 3,571,576 | 3/1971 | Satterfield | 235/92 CC |
| 3,586,835 | 6/1971 | Foeh | 235/92 CC |
| 3,632,996 | 1/1972 | Paine | 235/92 CC |

*Primary Examiner*—Gareth D. Shaw
*Assistant Examiner*—Robert F. Gnuse

[57] ABSTRACT

A digital log-time generator having a clock providing a predetermined pulse frequency output. The clock feeds a binary counter having a plurality of taps with each tap carrying a rate one-half that of the preceding tap. Means are provided for successively selecting the taps in descending order. A counter counts the number of pulses for each tap so as to provide a logarithmic output. An activating signal resets the system to zero whereby the next count can commence.

5 Claims, 5 Drawing Figures

DIGITAL LOG-TIME GENERATOR

This invention relates generally to log-time generators and more specifically to a digital log-time generator.

A log-time generator is used to provide a logarithmic measurement of time taken from the occurrence of an event. Such a generator is particularly useful in processing information related to the ratios of two or more time intervals. A particular example may be in the scanning of a delta-distance code pattern; i.e., where the ratios of dimensions contain the information. When time is measured logarithmically, division algorithms are reduced to subtractions and multiplication algorithms are reduced to additions.

Analog methods of generating logarithmic functions frequently employ resistive matrices or transconductance amplifiers with non-linear feedback. Digital types use a look-up table or recursive computing techniques. Analog methods suffer from limited accuracy and dynamic range. Digital approaches, on the other hand, tend to be complicated and relatively slow. Inadequate speed prevents operation in real time when short time intervals are involved.

The present invention provides a fast digital log-time generator which closely approximates a logarithmic measurement of real time and which functions with high accuracy over a very large dynamic range.

Accordingly, it is an object of this invention to provide a high-speed digital log-time generator.

Yet another object of this invention is to provide a digital log-time generator which can operate in real time over a broad range of time intervals.

A further object of this invention is to provide a digital log-time generator whose function is to provide an output count that is accurately related to the logarithm of time measured from a reference moment.

Another object of this invention is to provide a digital log-time generator capable of accommodating the indeterminate character of the logarithm of zero.

Still another object of this invention is to provide a digital log-time generator whose output is in binary notation.

A still further object of this invention is to provide a digital log-time generator producing linear interpolation so as to provide the desired functional result.

These and other objects of the invention will become apparent from the following description when taken in conjunction with the drawings wherein.

Broadly speaking, the present invention provides a digital log-time generator which comprises clock means for supplying a pulse output of a predetermined frequency, means for programming the clock output to obtain rates in descending powers of two, and means for counting the pulses of the programmed output of the clock with a resultant logarithmic output.

Figure 1:
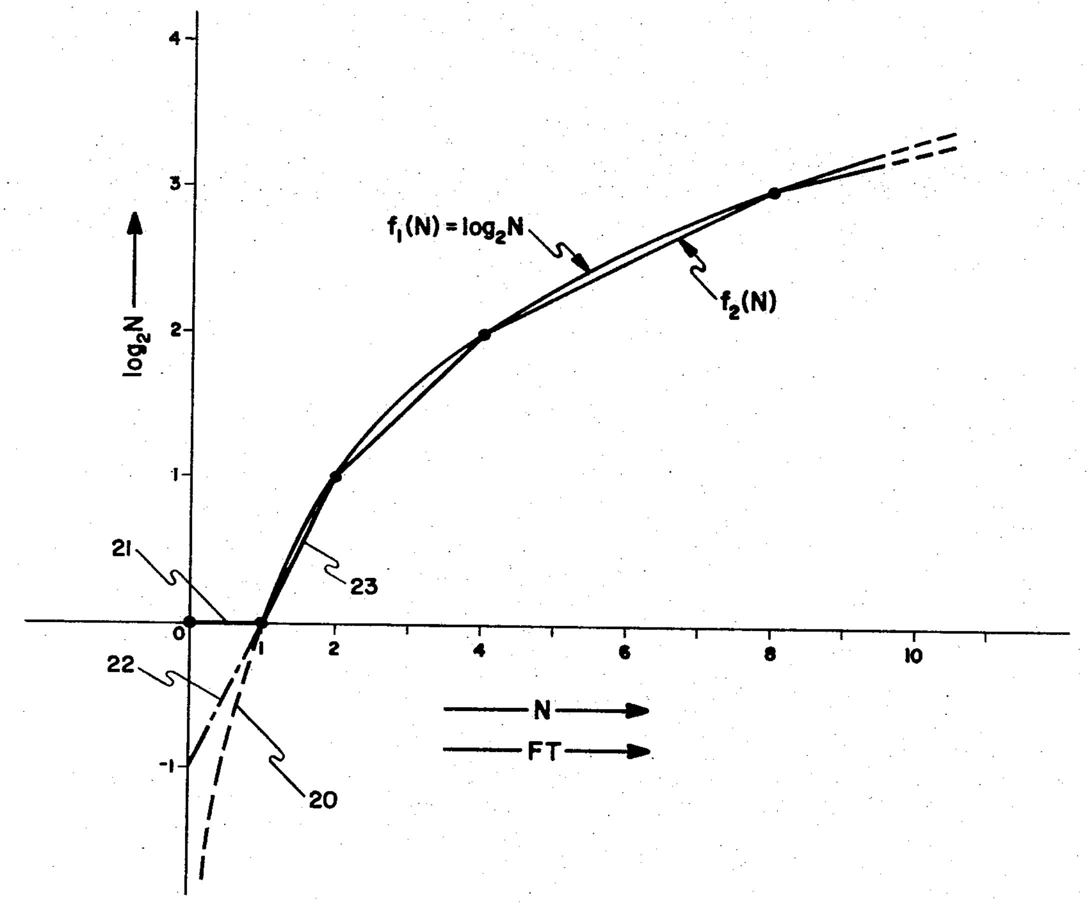
FIG. 1 is a graphic illustration of the linear interpolation of the present invention.

Turning now more specifically to the drawings, FIG. 1 graphically illustrates the linear interpolation used in the present invention. The following discussion is presented in conjunction with FIG. 1 for background purposes.

Since it is convenient for a binary system to generate a precise logarithmic function base 2, the error that would result by using linear interpolation between successive powers of two must be examined. The situation is depicted in FIG. 1 wherein the desired function, $f_1$ (N), is $\log_2 N$, and a piecewiselinear interpolating function is chosen so as to intersect $f_1$ (N) precisely at successive integer powers of two; i.e., where N = 1, 2, 4, 8, . . . , etc. If $N_p$ is any such integer power of two, the interpolating function, $f_2(N)$, is:

$$f_2(N) = \left| \begin{matrix} 2N_p \\ \\ N=N_p \end{matrix} \right. \frac{N}{N_p} + \log_2 N_p - 1 \qquad (1)$$

The maximum error produced by the piecewise-linear approximation can be obtained by finding the difference between $f_1$ (N) and $f_2$ (N), differentiating with respect to N, setting the derivative to zero, and substituting the resulting value for N back into the difference equation. The maximum error is found to be:

$$f_1(N) - f_2(N) = \log_2(\log_2 \epsilon) - \log_2 \epsilon + 1 = -.086 \qquad (2)$$

where $\epsilon = 2.718 \ldots$

When expressed as a percentage of the desired function, $\log_2 N$, the maximum error is:

$$\% \text{ Error} = -8.6/\log_2 N \qquad (3)$$

The count, $N$, can be obtained from a digital clock generator of frequency F. Time, $T$, is then related to $N$ by $N = FT$. Substituting FT for N in (3), the percentage maximum error as a function of a time interval, $T$, is:

$$\% \text{ Error} = -8.6/\log_2(FT) \qquad (4)$$

Equation (4) shows that through choice of a clock frequency, F, the interpolation error can be established for any interval of time, T, of interest. As time, T, increases the error indicated by (4) is seen to decrease due to the better piecewise approximation. It is thus evident that linear interpolation error can be reduced to a substantially satisfactory value for almost all applications when the clock frequency, F, is appropriately established.

As the time, T, approaches zero, and in particular when the denominator of (4) becomes less than one, the error expressed by (4) rises very rapidly. This results from the indeterminate nature of the logarithm of zero. The region of the function displaying this property is shown by the dashed line 20 of FIG. 1. $\text{Log}_2$FT approaches minus infinity as the time T approaches zero.

The present invention in a preferred form constrains the output function to a value of zero for values of N (or FT) less than one as shown by segment 21 of FIG.

1. If the clock frequency F is chosen to produce a value $FT_0$ = one for a smallest interval of interest $T_0$, the output function of FIG. 1 is seen to closely approximate the desired value for all intervals of interest. By increasing the clock frequency F the minimum interval $T_0$ can be made arbitrarily small.

Figure 2:
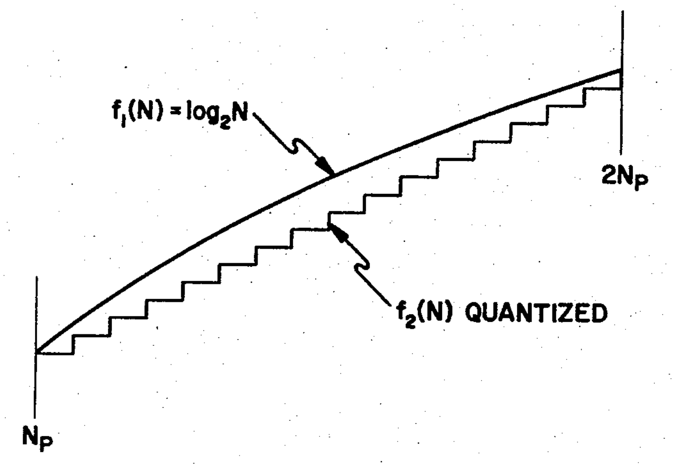
FIG. 2 is a graphic illustration of a quantized linear segment of FIG. 1.

Between points where N equals an integer power of two, the piecewise linear interpolation function can be generated by a binary count of a high-speed clock leading to the graphic situation of FIG. 2. Whenever such a count is invoked there is a quantization error inversely proportional to the number of counts provided. For example, if 16 high-speed clock pulses were equally distributed between successive powers of two, a quantization error of ±½ count, or about ±3 percent of the linear interval would be invoked. In general, the percentage quantization can be shown to be:

$$\% \text{ Quantization Error} = \pm\ 100/(2Q \log_2 N) \qquad (5)$$

where $Q$ is the number of counts between $N_p$'s (successive integer powers of two).

As an example of a design procedure, assume that a range of intervals from about 300 μsec to approximately 30 seconds (100,000:1 range) must be expressed logarithmically with a peak log-time error of less than 6 percent. Most of that error is chosen to stem from the piecewise approximation error of FIG. 1 and very little from the quantization process of FIG. 2. Using (4), the denominator should approximately equal 2 for a 4.3 percent error. Since $\log_2 4 = 2$, $FT = 4$. For $T = 3 \times 10^{-4}$ seconds $F = 13.3$ KHz. F is a rate at which N of FIG. 1 will increase with time.

The choice of F yields $\log_2 N = 2$ by (3) and (4) in the most severe case when $T = 3 \times 10^{-4}$ seconds. If 1.7 percent is allowable for the quantization error, (5) yields a Q of 14.7. For hardware convenience $Q = 16$ is chosen to produce a maximum error of 1.56 percent due to the quantization effect of FIG. 2, or a total maximum of 5.86 percent.

When (5) and (3) are equated the total error is about equally divided when Q equals 5.8. That will prove to be a near optimum choice if the fundamental clock rate is to be minimized. For hardware convenience therefore, a choice of 8 for Q is preferable if the clock rate criterion is of greatest concern. Accordingly, in some applications it may prove desirable to choose greater or less quantization error, but the example illustrates the manner by which an acceptable design can be established.

Figure 3:
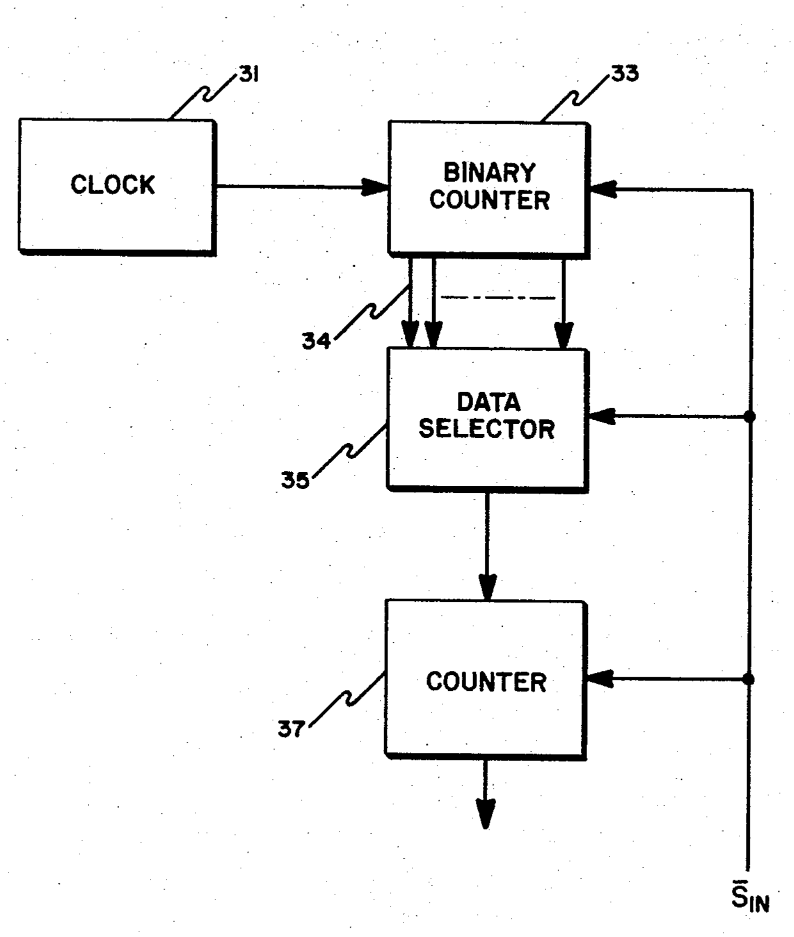
FIG. 3 is a basic block diagram representation of one form of the present invention.

FIG. 3 shows a basic schematic block diagram of the present invention.

A clock 31, which is set at a predetermined pulse frequency, drives binary counter 33 having a series of output taps 34. Each of the taps carries a rate one-half that of the preceding tap.

A data selector 35 is so designed as to select only a single tap from the binary counter at one period of time. The output of the selector is connected to a counter 37 which counts the number of pulses supplied from the particular selected tap over the period of time involved.

The $\overline{S}$ input resets all of the system to the zero state at which time the clock pulses from the clock are supplied to the system.

The data selection advances the address tap by tap in accordance with a predetermined period for each tap. This period depends upon the desired interpolation count required for the system. The advancement is such that the clock output is programmed so as to obtain rates in descending powers of two.

Figure 4:
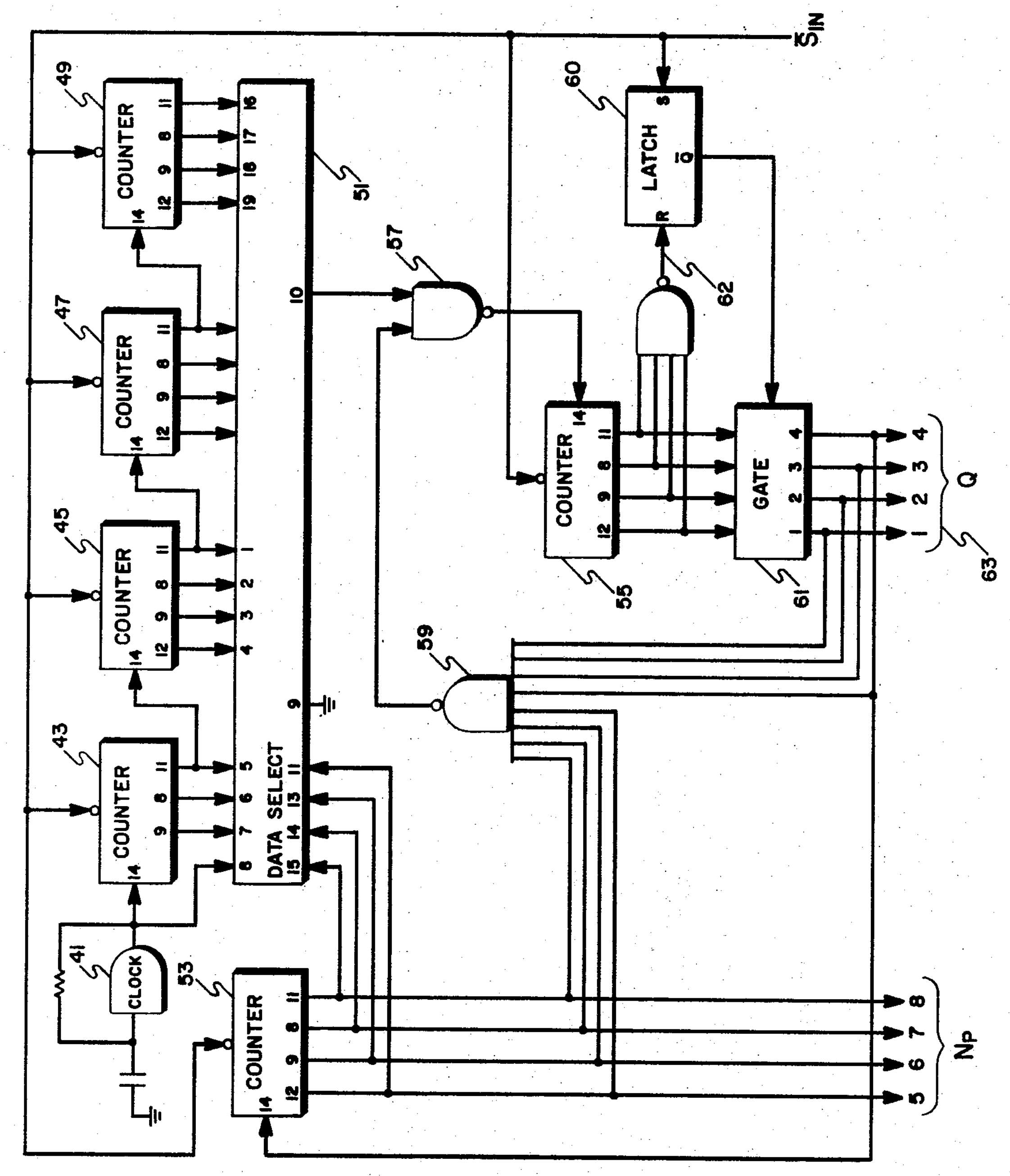
FIG. 4 is a detailed schematic illustration of a preferred form of the present invnetion.

Turning now to FIG. 4 there is shown a schematic diagram of a preferred embodiment of the present invention. In order to provide a clear understanding of the operation of this circuit certain values will be assumed. It is to be understood that these values are presented for illustrative and informational purposes only and are in no way intended to limit the invention as described herein.

A clock 41 produces a clock rate of FQ, assumed for illustrative purposes to be 200 KHz. The upper bank of binary counters 43, 45, 47, and 49 supply 16 clock output taps, each carrying a rate one half that of the preceding tap. A one-of-sixteen multiplexer 51 is used to select one clock tap at a time as determined by the 4-bit binary word on its Pins 15, 14, 13, and 11. The multiplexer thus programs the clock output to obtain rates in descending powers of two varying from 200 KHz to approximately 3 Hz (200 KHz divided by $2^{16}$). The operation is as follows:

Just prior to creating a log-time function, the entire system is reset by a low on $\overline{S}$ input. This sets all counters to the zero state.

When the clear pulse is terminated, clock pulses from the clock oscillator 41 are supplied to the clock input of the four-stage binary counter 43. The clock pulses at the 200 KHz rate are entered into Pin 8 of multiplexer 51.

Since binary counter 53 had been cleared to the zero state, multiplexer 51 transfers the data on Pin 8 to its output Pin 10.

The pulses from Pin 10 are counted by another binary counter 55. A NAND gate 57 between Pin 10 and counter 55 is open due to the clear action and lack of a high count.

The $\overline{S}$ input also sets latch 60 which turns off gate 61 so that the first group of clock pulses stemming from counter 55 will not appear at the Q outputs 63.

The counter 55 is arranged to yield Q counts in accordance with the teachings of Equation (5). For expository purposes Q = 16 will be assumed. When the 16th count is manifested at buss 62, the latch 60 is reset allowing future Q counts to appear at output busses 63.

If the clock frequency produced by the clock 41 is chosen to be QF and Q counts are blanked at the output by gate 61, the output remains zero for a period of time T = 1/F. That interval corresponds to the segment 21 of the output function of FIG. 1. When relatively long intervals are to be measured, the functions of the latch 60 and gate 61 can sometimes be eliminated without introducing excessive error. This is equivalent to shifting the curve of FIG. 1 left by one N count.

When a second count of 16 (corresponding to a linear interpolation region) has been reached, a low-going output from Pin 4 of gate 61 is seen by the clock input Pin 14 of the counter 53. The latter counter then advances the multiplexer address by one tap by changing the 4-bit binary word on the data select inputs.

Input Pin 7 of multiplexer 51 is then connected to the output Pin 10 causing the counting process to proceed at one half the initial rate. When another count of 16 has been attained the clock rate is again halved, etc.

The process is continued until a new clear pulse is received at $\overline{S}$ or until an overflow is sensed by the 8-input NAND 59.

The 8-bit digital word seen on output busses 1 through 8 will have a binary value corresponding to the total number of non-zero counts accrued by the system. The first 16 counts will have been rapid, the second 16 twice as slow, the third 16 four times as slow, etc. Each gamut of 16 corresponds to the linear interpolation between successive integer powers of two as described above.

A total of 256 counts can be accommodated by the circuits shown. The non-zero log-time output of the circuit of FIG. 4 can thus maximally consist of 16 zones of 16 counts each. Since the last 16 counts occur at a 3 Hz rate and represent the last half of the total time measured from the commencement of the process, the log-time generator of the present illustration can accommodate intervals as long as 10.7 seconds.

At the other extreme the first 16 counts will occur in an interval of 80 $\mu$sec.

When the shortest measurable interval is compared with the largest, the log-time generator is seen to have a dynamic range of over 100,000:1. If voltage were used to measure time, as for example in creating a ramp function, this corresponds to 100 db. Far greater ranges can result by increasing the number of counters slightly, due to the logging effect.

When the present invention is used primarily as a means of measuring the ratios of intervals, any additive constant in the output is removed during the subtractive process employed when taking a ratio. In that case a slightly better approximation to the desired output function in the vicinity of $N_\nu = 1$ is obtained by segment 22 of FIG. 1 instead of segment 21. Segment 22 encompasses negative output values, and unless special precautions are taken the output function will be shifted upward by one on the $\log_2 N$ scale. In the ratio application that shift is irrelevant, however, because it is equivalent to the addition of a constant at the output.

Figure 5:
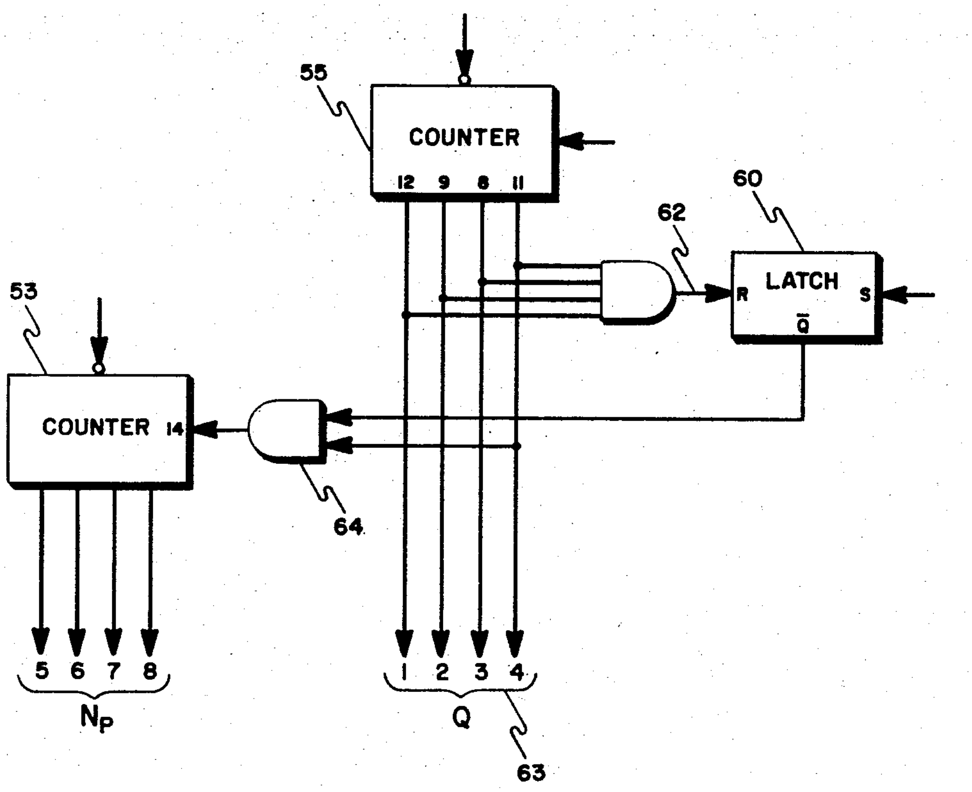
FIG. 5 is an alternate logical arrangement of a portion of FIG. 4..

The linear segment 22 can be generated in the present invention by substituting the logic of FIG. 5 for the corresponding portion of FIG. 4. With reference to said Figures the change is comprised of substituting gate 64 for the four-channel gate 61. Referring to FIG. 5, the Q counter 63 produces an output immediately following system reset. Accordingly, starting at time zero, linear segment 22 of FIG. 1 is generated. Under ordinary circumstances counter 53 would be advanced after Q counts. The latch 60 of FIG. 5 prevents that advance by inhibiting gate 64 until the trailing edge of the Qth count has been generated. Thus counter 53 will be stepped only after 2Q counts have occurred.

Referring to FIG. 1, a pair of linear segments 22 and 23 are accordingly generated before the curve slope is shifted by an advance of counter 53.

As can be seen, the present invention discloses an entirely digital log-time generator which provides the advantages of reliability, stability, convenience of logic design and relatively low cost.

The above description and drawings are illustrative only since modifications could be used without departing from the invention. Accordingly, the scope of the invention is to be limited only by the following claims.

I claim:

1. A digital log-time generator comprising binary counter means having multiple taps, each of said taps carrying a rate of one-half of that of the preceding tap;

clock means for supplying pulses of a predetermined frequency to said binary counter;

means for selecting one of said taps and counting the pulse output therefrom;

means for advancing the selecting means to the succeeding one of said taps after said count is completed;

means for supplying an activating signal to said generator; and means for constraining the output of said generator to a value of zero for a predetermined period of time after the application of said activating signal.

2. A digital log-time generator comprising binary counter means having multiple taps, each of said taps carrying a rate of one-half of that of the preceding tap;

clock means for supplying pulses of a predetermined frequency to said binary counter;

means for selecting one of said taps and counting the pulse output therefrom;

means for advancing the selecting means to the succeeding one of said taps after said count is completed;

means for supplying an activating signal to said generator;

gate means coupled to the output means for counting the output of said taps; and latch means coupled between said means for supplying an activating signal and said gate means for turning off said gating means during a predetermined period after the initiation of said activating signal.

3. A digital log-time generator comprising at least one binary counter having multiple taps, each tap carrying a rate of one-half that of the preceding tap;

clock means for supplying pulses of a predetermined frequency to said binary counter;

selector means connected to said binary counter for selecting one of said multiple taps;

counter means connected to said selector means for counting the pulse output therefrom;

data select means for advancing said selector means to a succeeding one of said multiple taps;

means for supplying an activating signal input to said binary counter, said selector means and said data select means;

output means from said counter means for supplying a digital log-time function;

gate means coupled between said counter means and said output means; and latch means coupled between said gate means and said means for supplying an activating signal for turning off said gating means for a predetermined period of time after initiation of said activating signal.

4. A digital log-time generator comprising at least one binary counter having multiple taps, each tap carrying a rate of one-half that of the preceding tap;

clock means for supplying pulses of a predetermined frequency to said binary counter;

selector means connected to said binary counter for selecting one of said multiple taps;

counter means connected to said selector means for counting the pulse output therefrom;

data select means for advancing said selector means to a succeeding one of said multiple taps;

means for supplying an activating signal input to said binary counter, said selector means and said data select means;

output means from said counter means for supplying a digital log-time function; and means for preventing the advancement of said data select means for a predetermined number of counts.

5. A digital log-time generator comprising clock means for supplying a pulse output of a predetermined frequency;

means for programming said clock means to obtain successive outputs having rates in descending powers of two;

means for generating a piecewise linear interpolation for each of said successive outputs;

means for counting said piecewise linear interpolation; and means for blocking the output of said means for said piecewise linear interpolation for a predetermined period of time.

* * * * *